(12) United States Patent
Vosseller et al.

(10) Patent No.: US 11,756,047 B2
(45) Date of Patent: Sep. 12, 2023

(54) FINGERPRINTING PHYSICAL ITEMS TO MINT NFT'S

(71) Applicant: eBay Inc., San Jose, CA (US)

(72) Inventors: Shannon Bruce Vosseller, Zürich (CH); Christopher Michael Matthews, Pacifica, CA (US); Andrew Chalkley, Portland, OR (US); Paul Telis Stathacopoulos, San Carlos, CA (US)

(73) Assignee: eBay Inc., San Jose, CA (US)

( * ) Notice: Subject to any disclaimer, the term of this patent is extended or adjusted under 35 U.S.C. 154(b) by 76 days.

(21) Appl. No.: 17/493,062

(22) Filed: Oct. 4, 2021

(65) Prior Publication Data

US 2023/0109574 A1    Apr. 6, 2023

(51) Int. Cl.
*G06Q 30/018* (2023.01)
*G06Q 30/0601* (2023.01)

(52) U.S. Cl.
CPC ....... *G06Q 30/018* (2013.01); *G06Q 30/0643* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 9,849,364 B2 | 12/2017 | Tran et al. | |
| 2020/0186338 A1 | 6/2020 | Andon et al. | |
| 2020/0273048 A1* | 8/2020 | Andon | G06Q 20/045 |
| 2022/0069996 A1* | 3/2022 | Xue | H04L 9/3239 |
| 2022/0366061 A1* | 11/2022 | Spivack | H04L 9/3271 |
| 2022/0366486 A1* | 11/2022 | McCoy | H04L 9/3239 |
| 2022/0407702 A1* | 12/2022 | Jakobsson | H04L 9/50 |
| 2023/0045071 A1* | 2/2023 | Kalaldeh | G06Q 20/389 |

OTHER PUBLICATIONS

"Non-Fungible Tokens (NFT)." Ethereum.Org, Mar. 9, 2021, ethereum.org/en/nft/. (Year: 2021).*
Flipkick,"Authenticate an NFT", Physical NFTs from the Famous and Infamous, Retrieved from Internet URL: https://www.flipkickio/authenticate, Accessed on Jul. 20, 2021, 2 Pages.
Flipkick,"Physical NFT", Physical NFT s from the Famous and Infamous, Retrieved from Internet URL: https://www.flipkick.io/physical-nft, Accessed on Jul. 20, 2021, 3 Pages.

(Continued)

*Primary Examiner* — Andrew B Whitaker
(74) *Attorney, Agent, or Firm* — FIG. 1 Patents

(57) ABSTRACT

Fingerprinting physical items to mint NFTs is described. One or more features of a physical item are captured using a fingerprint capture system of a client device, and a fingerprint of the physical item is generated using the captured features of the physical item. The fingerprint of the physical item is provided to an authentication service to verify that the physical item corresponds to an authentic physical item by matching the fingerprint of the physical item to distinguishing features of the authentic physical item. Responsive to verification by the authentication service, a digital twin NFT is minted on a blockchain using the matched fingerprint. A combined listing for the physical item and the digital twin NET is then generated on a listing platform.

20 Claims, 13 Drawing Sheets

(56) References Cited

OTHER PUBLICATIONS

Flipkick, "The Gardener's Lilies—A Physical NFT", NFTs From the Famous and Infamous, Retrieved from Internet URL: https://www.flipkick.io/nfts/the-gardeners-lilies-by-robin-damore, Accessed on Jul. 20, 2021, 2 Pages.

22197930.5, "Extended European Search Report", EP Application No. 22197930.5, dated Feb. 3, 2023, 11 pages.

Raj, Pethuru, "Chapter Thirteen—Empowering digital twins with blockchain", Advances in Computers, vol. 121 [retrieved Feb. 9, 2023]. Retrieved from the Internet <https://doi.org/10.1016/bs.adcom.2020.08.013>, 2021, 17 pages.

\* cited by examiner

FINGERPRINTING PHYSICAL ITEMS TO MINT NFT'S

BACKGROUND

Advances in technology, such as dramatic increases in computing power for smaller and smaller devices and development of more user-friendly tools for creating digital content, have led to the proliferation of digital content. Many creators of and/or persons responsible for popular digital content may want to receive a benefit for their role in making such digital content popular. In other words, they wish to have this digital content treated as an asset—a "digital asset." Non-fungible tokens (NFTs) are one mechanism that enable digital content to be treated as assets, and do so by programmatically encoding a unique identity of an original digital asset which distinguishes it from copies of the asset. By using NFTs, a provenance of the digital asset is also tracked—a transfer of the digital asset cannot occur, due to programmatic features of NFTs, without the transfer being digitally recorded. Because of this ability to uniquely identify an asset from other assets and because of the functionality to record every transaction involving the asset, developments are being made to use NFTs in connection with physical items, e.g., luxury goods. In contrast to purely digital assets, though, the transfer of valuable physical items as a result of a transaction poses vastly different problems.

SUMMARY

To overcome these problems, fingerprinting physical items to mint NFTs is leveraged. One or more features of a physical item are captured using a fingerprint capture system of a client device, and a fingerprint of the physical item is generated using the captured features of the physical item. The fingerprint of the physical item is provided to an authentication service to verify that the physical item corresponds to an authentic physical item by matching the fingerprint of the physical item to distinguishing features of the authentic physical item. Responsive to verification by the authentication service, a digital twin NET is minted on a blockchain using the matched fingerprint. A combined listing for the physical item and the digital twin NET is then generated on a listing platform.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
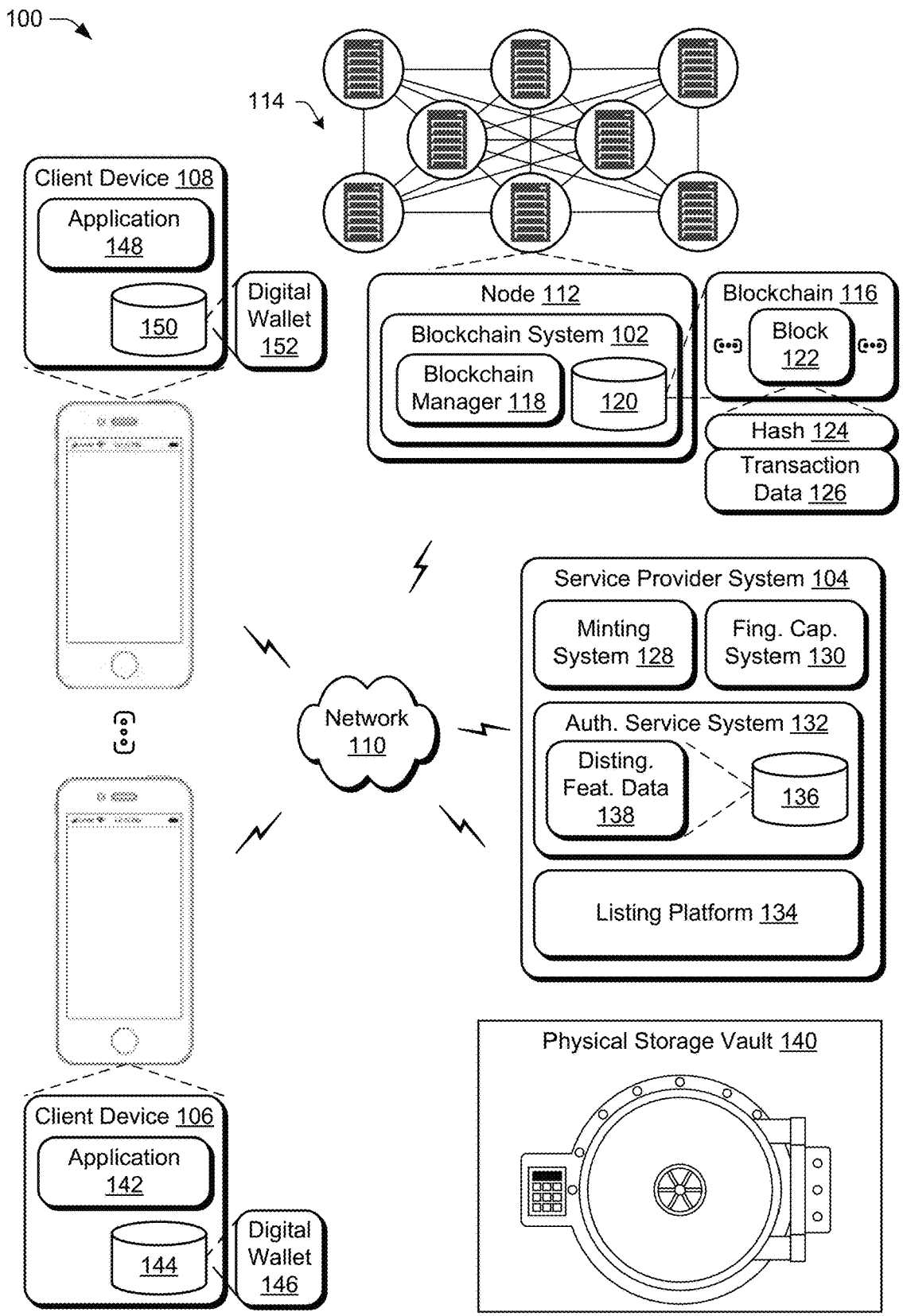
FIG. 1 is an illustration of an environment in an exemplary implementation that is operable to employ techniques described herein.

Conventional platforms for transferring ownership of NFTs do not enable a user to generate a combined listing that includes both a physical item and a digital twin NFT of the physical item. One reason for this is that conventional processes make it difficult to verify that the physical item is authentic such that a user who wishes to obtain both the physical item and the digital twin NET will trust that the physical item is authentic.

To solve these problems, fingerprinting physical items to mint NFTs is described. The described techniques streamline authentication of a physical item via a user's personal computing device rather than requiring the user to physically send the physical item to a physical authentication service. To do so, the system outputs a fingerprinting interface at a client device. The fingerprinting interface provides instructions to capture features of a physical item in order to generate a unique fingerprint. As an example, the fingerprinting interface may output textual instructions as part of a graphical user interface which describe how the user is to utilize a fingerprint capture device in order to capture features of the physical item. Alternately or additionally, the instructions may be output as audio prompts which direct the user to capture the features of the physical item using the fingerprint capture device. Next, the fingerprint capture device captures features of the physical item based on the instructions provided by the fingerprinting interface. By way of example, the fingerprint capture device may be implemented as a high-resolution camera which captures high-resolution image features of the physical item.

A fingerprint which uniquely identifies the physical item is generated using the captured features. The fingerprint is then provided to an authentication service to verify that the physical item corresponds to the authentic physical item. To do so, the authentication service matches the fingerprint of the physical item to distinguishing features of the authentic physical item. For example, if the physical item is a luxury watch, then the authentication service verifies that the luxury watch is authentic by comparing the fingerprint to known features of the luxury watch.

If the physical item is determined to be authentic, then the system initiates the minting of a digital twin NFT on a blockchain. The minting programmatically encodes an association of metadata with the digital twin NET. The metadata includes the fingerprint of the physical item, and can also include other digital content of the physical item, e.g., image(s) of the physical item, a description of the physical item, a condition of the physical item, and so forth. Notably, the condition of the physical item may change over time, whereas the fingerprint of the physical item is unique to the physical item itself and will not change even if the physical item suffers wear and tear or is damaged. In some cases, the metadata may also include an indication that the physical item has been verified as being authentic by the authentication service.

The combined listing, which includes both the physical item and the digital twin NFT, is then generated on a listing platform such that other users may obtain the physical item and the digital twin NFT, e.g., in exchange for a specified amount of cryptocurrency. Notably, a user that obtains the physical item and digital twin NET of the combined listing may utilize a similar authentication process of fingerprinting the physical item and confirming its authenticity by comparing the fingerprint to the fingerprint associated with the digital twin NET.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of an Environment

FIG. 1 is an illustration of an environment 100 in an example implementation that is operable to employ techniques described herein. The environment 100 includes a blockchain system 102, a service provider system 104, and a plurality of client devices (represented in the environment 100 by client device 106 and client device 108) that are communicatively coupled, one to another, via a network 110.

Computing devices that implement the environment 100 are configurable in a variety of ways. A computing device, for instance, is configurable as a desktop computer, a laptop computer, a mobile device (e.g., assuming a handheld configuration such as a tablet or mobile phone), an IoT device, a wearable device (e.g., a smart watch), an AR/VR device, a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud" as further described in relation to FIG. 6.

In accordance with the described techniques, the blockchain system 102 is implemented by a node 112 of a network 114 (e.g., a distributed network) of the nodes 112. Each of the nodes 112 is a runtime implemented using processing, memory, and network resources of respective computing devices that operate as the infrastructure of a blockchain 116. Here, the blockchain system 102 is illustrated including blockchain manager 118 and storage 120, the storage 120 being an example of a computing resource leveraged to implement the node 112. The blockchain system 102 also includes other resources of the one or more respective computing devices made available for operating as the node 112. Broadly, the blockchain manager 118 is configured to leverage those resources to implement the node 112 on behalf of the one or more computing devices.

By way of example, the blockchain manager 118 manages the storage 120 of the one or more computing devices implementing the node 112, such as by causing a copy of the blockchain 116 to be maintained in the storage 120. The copy of the blockchain 116 stored at the storage 120 may be a partial or full copy of the blockchain 116, depending on one or more characteristics of the node 112 (e.g., a type) and/or a time (e.g., whether updates have been made to the blockchain 116 via other nodes 112 in the network 114). The blockchain manager 118 may manage other resources of those computing devices in connection with operation of the blockchain 116, such as memory and processors of those devices to perform computations (e.g., transaction validation), operating systems of those devices, and network connections of those devices (e.g., to commit changes to the blockchain 116 and to receive updates to the node 112's copy of the blockchain), to name just a few. In short, the nodes 112 store, communicate, process, and manage data that makes up the blockchain 116. As illustrated in FIG. 1, the nodes 112 are interconnected to exchange data via the network 110, e.g., as a peer-to-peer network in a distributed and decentralized manner.

Broadly speaking, the blockchain 116 is formed using a plurality of blocks 122, illustrated in FIG. 1 as including a respective hash 124 and transaction data 126. The transaction data 126 of the blocks 122 includes batches of validated transactions that are hashed and encoded. Each of the blocks 122 includes the hash 124, which is a cryptographic hash of a previous block 122 in the blockchain 116, thereby linking the blocks 122 to each other to form the blockchain 116. As a result, the blocks 122 cannot be altered retroactively without altering each subsequent block 122 in the blockchain 116 and in this way protecting against attacks by malicious parties.

In order to publish the blocks 122 for addition to the blockchain 116, a node 112 may be implemented as a "miner" to add a block of transactions to the blockchain 116. In one or more implementations, other nodes may communicate transactions received at those nodes to one or more mining nodes for validation. Mining nodes may perform peer-to-peer computations to check if transactions intended for the blockchain 116 are valid and, if validated, may add validated transactions to a block 122 that those nodes are building. If the transactions are determined to be valid, for instance, then the transaction data 126 describing those transactions is encoded in or otherwise stored on a respective block 122, which is linked to the blockchain 116 such that the new block is "at the end" or "at the top" of the blockchain 116, e.g., through inclusion of the hash 124 of a previous block in the chain.

The nodes 112 then broadcast this transaction history via the network 110 for sharing with other nodes 112. This acts to synchronize the blocks 122 of the blockchain 116 across the distributed architecture of computing devices. A variety of "types" of nodes 112 may be used to implement the blockchain 116. By way of example, the blockchain 116 may be implemented at least in part using "full" nodes, which are nodes that store an entirety of the blockchain 116, e.g., locally in computer-readable storage media of respective computing devices of the nodes 112. Other types of nodes may also be employed to implement additional functionality to govern voting events, execution of protocol operations, rules enforcement, and so forth.

The blockchain 116 may be leveraged to provide a diverse range of functionality. Due in part to the distributed storage and updating of the blockchain 116 over the network 114 of nodes 112, the blockchain 116 may store its data in a decentralized manner, without a centralized database (e.g., run by a clearinghouse), and thus operate as a distributed ledger. The decentralized storage of the blockchain 116 overcomes one of the major disadvantages of centralized storage, which is that centralized storage essentially has a single point of failure. It is to be appreciated that in one or more implementations, the blockchain 116 may be public (e.g., like Ethereum and Bitcoin blockchains), such that transactions on the blockchain 116 are generally viewable with a connection to the Internet. Alternatively, the blockchain 116 may be configured as a private blockchain, in one or more implementations. When the blockchain 116 is a "private" blockchain, the computing devices used to implement the nodes 112 may be controlled by a centralized authority, such as a company or a consortium of entities.

As a distributed ledger, the blockchain 116 supports the secure transfer of digital assets, such as the transfer of a cryptocurrency and/or tokens. Broadly speaking, cryptocurrencies (e.g., coins of the cryptocurrency) are the native assets to blockchains, whereas tokens are created "on top" of these blockchains. Tokens may be created "on top" of the blockchain 116 by using a "token standard" which allows the token to interoperate with the blockchain 116's network of nodes 112 according to one or more protocols of the blockchain, such that the transaction data 126 and the hashes 124 of the blocks 122 are leveraged to create, trade, and update tokens. By way of example, the Ethereum blockchain's native asset is ether (ETH), a cryptocurrency. Nevertheless, tokens may be created on top of Ethereum's blockchain by using one or more of Ethereum's token standards for creating tokens, such as by using ERC-20, ERC-721, ERC-1155, and EIP-2309, to name just a few.

Regardless of the particular blockchain protocol(s) and features used, the tokens created on top of the blockchain 116 may be "programmable," meaning that they run on software protocols and can be configured to include logic executed by computing resources (e.g., of the nodes 112). This enables the tokens to implement smart contracts that define conditions for the token and the network 114's rules of engagement. Broadly, a "smart contract" is self-executing code that carries out a set of instructions in accordance with terms of the contract, and this carrying out of the set of instructions is then validated by the blockchain 116. For instance, the self-executed code is sent to an address on the blockchain 116 as a blockchain transaction and, at the address, the code sent is validated, e.g., by a consensus mechanism of the blockchain 116. Once validated, this transaction may be included in a block 122, such that the smart contract is initiated and irrevocable.

In addition or alternatively, tokens, implemented according to a token standard (e.g., ERC-721 or ERC-1155) and by leveraging the architecture and protocols of the blockchain 116, can be programmatically encoded as non-fungible assets that are individually unique and cannot be directly interchanged with other similar tokens "like-for-like". In accordance with the described techniques, for instance, the architecture and protocols of the blockchain 116 can be leveraged to create non-fungible tokens (NFTs) on the blockchain 116. By using the transaction validation carried out by the nodes 112, the blockchain 116 certifies that a given NFT is digitally unique and thus not interchangeable with other NFTs. When an NET is minted (i.e., programmatically brought into existence), the blockchain 116's protocols generate a unique token identifier that is encoded in the NFT—the unique identifier may be generated using one or more randomization approaches. As used herein, the term "non-fungible" refers to the property of a token to uniquely represent an asset, such that a digital signature of the token represents the underlying asset in a way that is not directly interchangeable with (e.g., "like-for-like"), or equal to, any other tokens. This contrasts with cryptocurrencies, which are "fungible" because two coins of a same cryptocurrency (e.g., two Ether or two Bitcoins) can be traded or exchanged for one another and are of equal value.

Instead, each NFT is programmatically created to include a unique, non-transferable identity which distinguishes it from other NFTs. In one or more implementations, an NFT may encode underlying digital content, e.g., underlying digital art, an image, music, a video, in-game content, text (e.g., a story or writing), a composition of multiple types of digital media, a file, or a 3D-model, to name just a few. Alternatively or additionally, an NFT may encode an association with or to the digital content, e.g., a uniform resource locator (URL) or other location information that describes a location where the digital content and/or data about the digital content is stored. In one or more examples, for instance, rather than encoding the digital content for storage in the NFT, the digital content may be stored in third-party storage, e.g., storage of the service provider system 104 or storage of another service provider. As discussed above and below, an NFT created and maintained on the blockchain 116 is configured to encode other information in addition to underlying digital content, or an association with the underlying digital content.

In accordance with the described techniques, the service provider system 104 includes a variety of functionality for creating NFTs and executing transactions involving NFTs, e.g., listing NFTs for sale, purchasing NFTs, easily creating smart contracts with different terms (e.g., royalties and/or fractional ownership structures and rules) to govern transactions involving an NET, initiating execution of smart contracts encoded by NFTs, and so forth. As illustrated herein, the service provider system 104 includes a minting system 128, a fingerprint capture system 130, an authentication service system 132, and listing platform 134. The authentication service system 132 is depicted having storage 136 which stores distinguishing feature data 138, which the authentication service system 132 uses to authenticate physical items, including physical items for which digital twinned NFTs are created as discussed above and below.

It is to be appreciated that the service provider system 104 may include more, fewer, and/or different components than illustrated without departing from the spirit or scope of the described techniques. Additionally, portions or entireties of one or more of the components may be implemented at client devices, such as part of applications at the client device 106 and/or the client device 108. For instance, at least a portion of the fingerprint capture system 130 (or the other illustrated components) may be implemented at the client devices 106, 108, e.g., as at least part of an application, as a plug-in, via a web page output (e.g., displayed) by the client devices, and so on.

The illustrated environment 100 also includes physical storage vault 140, which may be utilized in one or more implementations, e.g., to store physical items having digital twinned NFTs for safe keeping. The physical storage vault 140 may be included as part of the service provider system 104 or may be controlled by a third party and simply associated with or otherwise accessible to the service provider system 104.

To enable respective users to initiate operations to create NFTs and to perform transactions involving NFTs, the client device 106 and the client device 108 include components to interact within the environment 100. The client device 106 is illustrated including application 142 (e.g., a computer application) and storage 144, which is depicted storing digital wallet 146. The client device 108 is illustrated including application 148 (e.g., a computer application) and storage 150, which is depicted storing digital wallet 152. The applications 142, 148 may be configured in a variety of ways in accordance with the described techniques. For example, the applications 142, 148 may be mobile applications, plug-ins, or web-browsers to access web pages providing NFT-based services, to name just a few. The applications 142, 148 may be separate installations of a same application, e.g., a mobile application of the service provider system 104. Alternatively or additionally, the applications 142, 148 may correspond to a digital wallet service provider (not shown), which provides respective digital wallets 146, 152. Alternatively or in addition, the digital wallets 146, 152 may be accessible to the respective applications 142, 148, e.g., via an application programming interface (API), to carry out operations involving NFTs on the blockchain 116.

By way of example, the respective applications 142, 148 may receive user input via a user interface to initiate ownership transfer of an NET from a user associated with the client device 106 to a user associated with the client device 108, e.g., by transferring the NFT from the digital wallet 146 to the digital wallet 152. The digital wallets 146, 152 may store public and private cryptographic keys that are used to digitally link transactions on the blockchain 116 to user accounts corresponding to the wallets. Generally, the information stored on the wallets may point to assets' locations in terms of blocks on the blockchain and there is a unique cryptographic address issued by a wallet, such that the transaction data 126 encodes wallet addresses of parties to the transaction.

Returning to the components of the service provider system 104, the minting system 128 is configured to "mint" NFTs. To mint an NET, the minting system 128 causes the NFT to be created on the blockchain 116 and programmatically encodes an association of metadata with the NET. In accordance with the described techniques, for example, the minting system 128 is configured to mint digital twin NFTs of physical items. The metadata for a digital twin NET may include a fingerprint of the physical item (e.g., a high-resolution image of one or more features of the item, a LIDAR scan of the physical item, etc.) and digital content of the physical item (e.g., an image of the physical item for presentation, a video of the physical item, and/or a 3D model of the physical item). The metadata may also include other information, such as a description of the item, a condition of the physical item (which can change over time), an indication that the physical item is an authentic physical item, an indication that the physical item is not an authentic physical item, a physical location where the item was minted (e.g., at a residence, at a location corresponding to a facility of the service provider system, at an event such as a concert or sporting event, and so on), locations of transactions involving the physical item, public addresses of wallets of owners of the NET, and/or a current location of the physical item, to name just a few The minting system 128 may encode an association of this metadata with the digital twin NET by, for example, encoding the actual data (e.g., the unique fingerprint and/or the digital content) in the digital twin NFT, encoding unique identifiers of the actual data in the digital twin NET, and/or encoding one or more addresses where such data is located (e.g., a storage location) in the digital twin NET. In operation, the minting system 128 provides data as specified by a token standard associated with the blockchain 116 to one or more of the nodes 112 to mint a new digital twin NFT of a physical item. For example, the minting system 128 packages and communicates the actual metadata to be encoded and/or packages and communicates the association (e.g., identifier and/or addresses) to be encoded according to the token standard to the one or more nodes 112.

The fingerprint capture system 130 is configured to generate digital fingerprints of physical items that uniquely identify a given physical item from other physical items. The fingerprint capture system 130 generates those fingerprints based on captured features of the physical items, such as features captured using sensors of one or more devices. As discussed below, the features may be captured using one or more sensors of client devices (e.g., the client devices 106, 108), one or more sensors of the fingerprint capture system 130 (e.g., when configured with hardware to capture the features of physical devices), and/or sensors of other devices. By way of example, the client devices and/or the fingerprint capture system 130 may include a high-resolution digital camera to capture high-resolution digital image features of physical items.

The authentication service system 132 is configured to verify whether a physical item corresponds to an authentic physical item. The authentication service system 132 may verify whether a physical item corresponds to an authentic physical item by matching the fingerprint of a physical item, as generated by the fingerprint capture system 130, to distinguishing feature data 138 of a known authentic physical item. The authentication service system 132 may do so by comparing a fingerprint, or captured features encoded in the fingerprint, to portions of the distinguishing feature data 138, e.g., searching the distinguishing feature data 138 for data having at least a threshold similarity to the fingerprint or portions of the fingerprint. The authentication service system 132 may then return a response indicating that a physical item is or is not an authentic physical item (or is unsure whether the physical item is or is not authentic) based on whether the fingerprint matches any of the distinguishing feature data 138.

The listing platform 134 is configured to generate listings for items and to expose those listings (e.g., publish them) to one or more client devices. For example, the listing platform 134 may generate listings for items for sale and expose those listings to client devices, such that the users of the client devices can interact with the listings via user interfaces to initiate transactions (e.g., purchases, add to wish lists, share, and so on) in relation to the respective item or items of the listings. In accordance with the described techniques, the listing platform 134 is configured to generate listings for physical items or property (e.g., collectibles, luxury items, clothing, electronics, real property, physical computer-readable storage having one or more video games stored thereon, and so on), services (e.g., babysitting, dog walking, house cleaning, and so on), digital items (e.g., digital images, digital music, digital videos) that can be downloaded via the network 110, and NFTs, to name just a few. Notably, the listing platform 134 is configured to generate a combined listing that includes both a physical item and a digital twin NET of the physical item. The listing platform 134 may generate the combined listing, which lists both the physical item and the digital twin NET, based on user input received from a client device associated with a user account (e.g., of the listing platform 134) and received via a user interface to generate the combined listing. For example, the service provider system 104 may initiate the minting of a digital twin NFT of a physical item and initiate the listing of both the physical item and the digital twin NFT responsive to receiving such user input via a user interface of the application 142, 148, as output at the client device 106 or the client device 108.

Optionally, the service provider system 104 may store physical items at the physical storage vault 140, such as valuable physical items having digital twin NFTs. Storage of the underlying physical item at the physical storage vault 140 allows ownership of the digital twin NFT and the physical item to be easily transferred between owners without the hassle of physically moving the item to transfer possession, e.g., shipping the item or exchanging it between hands. Instead, the item may be transferred to the physical storage vault 140 for storage and remain in the physical storage vault 140 while ownership of the physical item and/or its digital twin NFT is transferred a number of times. The physical storage vault 140 may also maintain physical items where ownership is divided, using a digital twin NFT, into a number of fractions of ownership of the physical item, e.g., "shares" of the physical item issued according to terms of the digital twin NET.

Having considered an example of an environment, consider now a discussion of some examples of details of the techniques for fingerprinting physical items to mint NFTs in accordance with one or more implementations.

Fingerprinting of Physical Items to Mint NFTs

Figure 2:
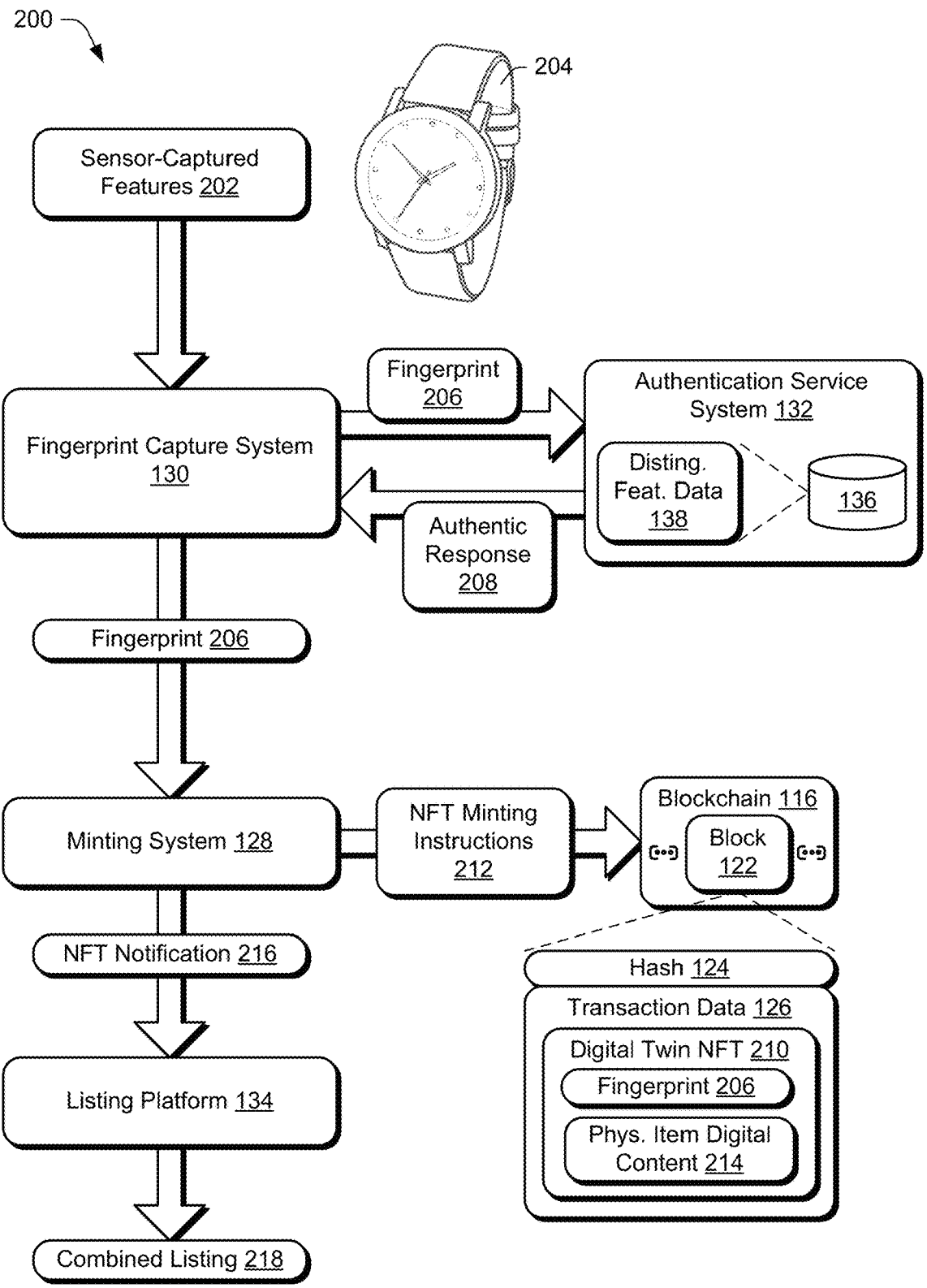
FIG. 2 depicts an example of a system to fingerprint physical items to mint NFTs.

FIG. 2 depicts an example 200 of a system to fingerprint physical items to mint NFTs. The illustrated example 200 includes from FIG. 1 the fingerprint capture system 130, the authentication service system 132, the minting system 128, and the listing platform 134. The illustrated example 200 also includes the blockchain 116.

In this example 200, the fingerprint capture system 130 is depicted obtaining sensor-captured features 202 of physical item 204. In accordance with the described techniques the sensor-captured features 202 correspond to data describing one or more aspects of the physical item 204 and may include various information captured about the physical item 204, e.g., using sensors of one or more devices. For instance, this information may be generated about the physical item 204 using one or more sensors of the client device 106, the client device 108, and/or one or more sensors of the fingerprint capture system 130 when the fingerprint capture system 130 includes sensors to capture features of physical items.

By way of example, the fingerprint capture system 130 may be implemented at least partially at a client device (e.g., a client device 106, 108) having the one or more sensors. Alternatively or in addition, the fingerprint capture system 130 may be configured as or include a receptable into which, or a platform onto which, physical items may be placed so that sensors of the fingerprint capture system 130 can scan the item to generate the sensor-captured features 202.

Examples of sensors that may be used to generate the sensor-captured features 202 include, but are not limited to, imaging sensors (e.g., one or more high-resolution digital cameras, one or more low-resolution digital cameras), temperature sensors, LIDAR, biochemical sensors, and so on. Examples of the sensor-captured features 202 may include, but are not limited to, images (e.g., high-resolution images of the physical item 204's features), videos of the physical item 204, data derived from various electromagnetic spectrum features captured by the sensors about the physical item 204, measured temperatures at different locations of the physical item 204 (or a map of them), a LIDAR scan of the physical item 204, or measurements (or estimated values) of one or more elements or compounds at different locations of the physical item 204, to name just a few. It is to be appreciated that the sensor-captured features 202 may be produced by a variety of sensors of different devices and describe a variety of features about the physical item 204 without departing from the spirit or scope of the techniques described herein.

Based on the sensor-captured features 202, the fingerprint capture system 130 generates a fingerprint 206 of the physical item 204. The fingerprint 206 is unique to the physical item 204 and may be used to uniquely identify the physical item 204 from other physical items, including from another specimen of the same item (e.g., two luxury watches of the same brand, make, model, etc.). For example, the fingerprint 206 may be configured as a unique digital signature that identifies the physical item 204 from other physical items. Notably, the fingerprint capture system 130 can generate the fingerprint 206 to digitally encode the sensor-captured features 202 of the physical item 204 at various points in time after manufacture of the physical item 204. In other words, the fingerprint capture system 130 is not reliant on the manufacturing process to generate the fingerprint 206 so that it uniquely identifies the physical item 204. In this way, the fingerprint capture system 130 is configured to generate the fingerprint 206 without modifying the physical item 204. This contrasts with techniques that rely on an identifier to be manufactured into or otherwise incorporated with the physical item 204, examples of which include configuring a physical item with an RFID tag and/or applying (e.g., stitching in or printing) an identifier to the physical item.

In accordance with the described techniques, the authentication service system 132 is configured to authenticate the physical item 204 based on the fingerprint 206. Here, the authentication service system 132 is depicted obtaining the fingerprint 206 from the fingerprint capture system 130. The fingerprint capture system 130 may transmit the fingerprint 206 to the authentication service system 132 for authentication, in accordance with the described techniques. As noted above, for instance, the fingerprint capture system 130 may be implemented at least in part at a client device, e.g., as part of the application 142 at the client device 106 and/or as part of the application 148 at the client device 108. Thus, one of the client devices 106, 108 may transmit the fingerprint 206 to the authentication service system 132 over the network 110.

Broadly, the authentication service system 132 verifies that the physical item 204 corresponds to an authentic physical item. To do so, the authentication service system 132 compares the fingerprint 206 to the distinguishing feature data 138 stored in the storage 136. The distinguishing feature data 138 describes features of one or more physical items that are known to be authentic and is saved in the storage 136. The authentication service system 132 is capable through a computerized comparison of the digital fingerprint 206 and the distinguishing feature data 138 of identifying those authentic items and/or differentiating them from items that are not authentic (e.g., knockoffs). Some of the comparison techniques used by the authentication service system 132 may not be possible by humans because humans do not have the sensory capacity to detect one or more of the same features and/or compare digital fingerprints to the distinguishing feature data 138 at the level required to identify a physical item as authentic.

If the authentication service system 132 determines that there is a match between the fingerprint 206 and the distinguishing feature data 138, then the authentication service system 132 determines that the physical item 204 is an authentic physical item. If the authentication service system 132 does not determine that there is a match between the fingerprint 206 and the distinguishing feature data 138, however, then the authentication service system 132 may determine that the physical item 204 is not an authentic physical item. In one or more implementations, the authentication service system 132 may determine that there is a match between the fingerprint 206 and the distinguishing feature data 138 based on identifying a threshold similarity between the fingerprint 206 and the respective distinguishing feature data 138. In this way, a physical item that is not identical to a known authentic item, but is "close enough" to have a high likelihood of being authentic, may be determined authentic by the authentication service system 132, such that the physical item 204 is considered a "match" to authentic physical items.

Based on matching the fingerprint 206 to data in the distinguishing feature data 138, the authentication service system 132 provides an authentic response 208, indicating that the physical item 204 is an authentic physical item. In the illustrated example 200, for instance, the authentication service system 132 communicates the authentic response 208 to the fingerprint capture system 130, although it is to be appreciated that the authentic response 208 may be communicated to and thus received by the service provider system 104 and any modules thereof. In the scenario where the authentication service system 132 does not find a suitable match between the fingerprint 206 and the distinguishing feature data 138, the authentication service system 132 may determine that the physical item 204 is not authentic and may communicate a response indicating that the physical item 204 is not authentic, e.g., to the fingerprint capture system 130 or to another component.

The minting system 128 obtains the fingerprint 206, such as from the fingerprint capture system 130 as depicted. Receipt of the fingerprint 206 by the minting system 128 may be responsive to the authentic response 208 indicating that the physical item 204 is an authentic physical item. In one or more scenarios, however, the minting system 128 may receive the fingerprint 206 for an item that is determined not to be authentic by the authentication service system 132.

Regardless, the minting system 128 is configured to cause a digital twin NFT 210 of the physical item 204 to be minted on the blockchain 116. To do so, the minting system 128 may provide NET minting instructions 212, e.g., to one or more of the nodes 112 in the network 114 of nodes. The NFT minting instructions 212 may be configured according to and include data specified by a token standard, e.g., ERC-721 or ERC-1155, for creating the digital twin NFT 210. Once created, the digital twin NFT 210 has a unique token identifier that uniquely identifies the token from other tokens—the token identifier may be a uint256 variable, for instance. In accordance with the described techniques, the information included in the NET minting instructions 212 enables a node 112 to programmatically encode in the digital twin NET 210 information provided or indicated in the NET minting instructions 212. For example, the NET minting instructions 212 may include an association with metadata, such as an association with the fingerprint 206 and physical item digital content 214. The node 112 receiving those instructions may thus encode the association with the metadata into the digital twin NET 210.

Here, the digital twin NFT 210 is depicted including the fingerprint 206 and the physical item digital content 214. It is to be appreciated that in one or more implementations, however, the digital twin NFT 210 may include references to the fingerprint 206 and the physical item digital content 214 instead of the actual content. Such references may be configured as pointers to the actual content (e.g., URLs or storage locations) and/or unique identifiers (e.g., GUID) of the actual content. By encoding associations with the actual content rather than encoding the actual digital content (e.g., the fingerprint 206 and/or the physical item digital content 214), the minting system 128 may limit the use of hardware resources (e.g., processing) of the nodes 112 for minting the digital twin NFT 210. By limiting an amount of resources used, the minting system 128 may proportionally reduce a "gas" fee required by the blockchain 116 to utilize those resources and mint the digital twin NET 210.

As noted above, the digital twin NET 210 may also programmatically encode other information. For example, the digital twin NFT 210 may programmatically encode a public address of a digital wallet of a user associated with minting the NET, e.g., a public address of the digital wallet 146 in a scenario where a user associated with the client device 106 provides user input via a user interface to mint the digital twin NET 210. The digital twin NET 210 may also be configured to digitally record a provenance of the NFT, such that ownership information is captured each time the digital twin NFT 210 is transferred (in whole or in part). For example, if the minting user transfers the digital twin NFT 210 to a new user, then the transfer from the wallet address of the minting user to a wallet address of the new user is recorded in the digital twin NFT 210's data on the blockchain 116. As with other transactions on the blockchain 116, one or more of the nodes 112 validates such a transfer so that only valid transfers are committed to the blockchain 116.

The digital twin NFT 210 may be minted to encode other data, examples of which include smart contracts (e.g., to govern royalties, fractional ownership processes and events, end-of-life of the NFT events, and so forth), description of other aspects of the physical item 204 (e.g., a condition of the physical item 204, provenance of different parts of the physical item 204, maintenance record of the physical item 204, and so forth). The digital twin NFT 210 may also be minted to encode various metadata, such as a description of the physical item 204, a condition of the physical item 204 (which can change over time), an indication that the physical item 204 is an authentic physical item, an indication that the physical item 204 is not an authentic physical item, a physical location where the physical item 204 was minted (e.g., at a residence, at a location corresponding to a facility of the service provider system, at an event such as a concert or sporting event, and so on), locations of transactions involving the physical item 204, and/or a current location of the physical item 204, to name just a few With regard to a physical item's condition, the service provider system 104 may be configured to determine a condition of a physical item and capture the determined condition as a state in the digital twin NFT 210 or other data associated with the physical item 204. In one or more implementations, the service provider system 104 may be configured to determine a condition of the physical item 204 using the sensor-captured features 202. The service provider system 104 may further be configured to generate or set metadata (e.g., a state) describing the determined condition of the physical item 204. To this end, the minting system 128 may also cause an association with metadata describing the condition of the physical item 204 to be encoded in the digital twin NFT 210, i.e., in addition to encoding the association with the fingerprint 206.

In this way, a condition of the physical item 204 may be encoded separately from data that uniquely identifies the physical item 204 from other physical items, e.g., separately from the fingerprint 206. Due to this separate determination and encoding, the condition encoded by the digital twin NET 210 may change over time, but the fingerprint 206 of the item does not change over time. By way of example, the digital twin NFT 210 may encode an association with metadata that describes a condition of the item in terms of "new" or "used," an amount the item is used, a relative amount of use compared to other items, an age of the item, and/or changes to the item from one or more previous times features of the item were captured, to name just a few. Consider a scenario, after the digital twin NFT 210 is minted, in which additional features of the physical item 204 are captured e.g., by sensors of one or more devices. The service provider system 104 is configured to compare the newly captured features to the sensor-captured features 202 used in connection with minting the digital twin NET 210. Based on this comparison, the service provider system 104 may determine that the condition of the physical item 204 has changed subsequent to minting the digital twin NET 210. Based on determining that the condition of the physical item 204 has changed over time, the service provider system 104 may update the metadata of the digital twin NET 210 to indicate the changed condition of the physical item 204. It is to be appreciated that the digital twin NFT 210 may encode a variety of information in relation to the physical item 204 as discussed above and below.

In this example 200, the listing platform 134 is depicted receiving NFT notification 216. The NFT notification 216 may describe a location of the digital twin NFT 210 on the blockchain 116. For example, the NFT notification 216 may include the token identifier of the digital twin NFT 210 and/or an address of a digital wallet of a current owner of the digital twin NFT 210. Additionally or alternatively, the NFT notification 216 may indicate that the digital twin NFT 210 is to be listed by the listing platform 134 along with the physical item 204. The NFT notification 216 may be received responsive to receiving a user request to generate a combined listing for the physical item 204 and the digital twin NFT 210. Alternatively or additionally, the NFT notification 216 may be automatically received by the listing platform 134 responsive to the digital twin NET 210 being minted on the blockchain 116.

Regardless, the listing platform 134 generates a combined listing 218, which lists both the physical item 204 and the digital twin NFT 210 together. For example, the combined listing 218 may list the combination of the physical item 204 and the digital twin NET 210 for sale together via the listing platform 134. In the illustrated example 200 the listing platform 134 is depicted outputting the combined listing 218. This output of the combined listing 218 may correspond to publishing the combined listing 218 to one or more client devices, e.g., associated with user accounts of the service provider system 104 or that navigate to user interfaces of the service provider system 104. By way of example, the combined listing 218 may be displayed or otherwise output by a web application (e.g., the application 142 or the application 148) via a user interface at the client devices 106, 108. In one or more implementations, the listing platform 134 may expose the combined listing 218 to a plurality of client devices, such that users navigating to the listing or searching for listings can view the combined listing 218.

In the context of example user interfaces for minting a digital twin NFT of a physical item and listing the physical item and the digital twin NFT in a combined listing, consider the following discussion.

FIGS. 3A-3H depict an example 300 of various user interfaces output in an example scenario of fingerprinting a physical item to mint a digital twin NFT in accordance with the described techniques.

Figure 3A:
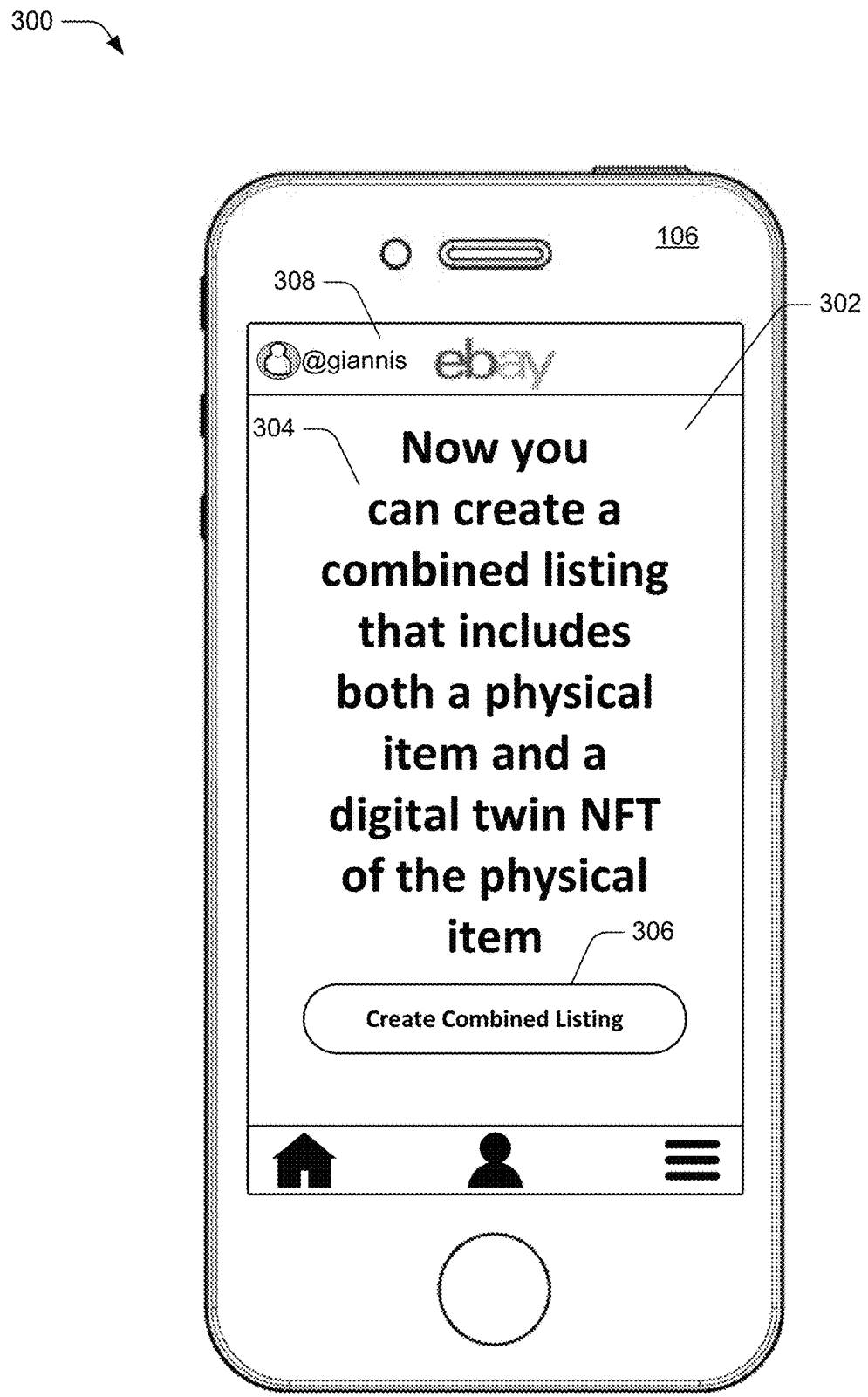
FIGS. 3A-3H depict an example of various user interfaces output in an example scenario of fingerprinting a physical item to mint a digital twin NET in accordance with the described techniques.

Beginning at FIG. 3A, the illustrated example 300 depicts a user interface 302 displayed on a display device of the client device 106. The user interface 302 includes information 304 indicating that the user can "create a combined listing that includes both a physical item and a digital twin NET of the physical item". The user interface 302 also includes a selectable element 306 which can be selected by the user to begin the process of generating the combined listing for a physical item. The user interface 302 may correspond to a user interface of the service provider system 104 that is associated with the listing platform 134, such as a user interface displayed by a corresponding application 142 via a display device of the client device 106. The application 142 may be configured in a variety of ways in accordance with the described techniques. For example, the application 142 may be a mobile application, plug-in, or web-browser, to name just a few. Here, the user interface 302 also includes a user account identifier 308 which indicates that the user "@giannis" is signed into a user account associated with the service provider system 104.

FIGS. 3B-3F depict the user interface 302 displaying various screens and elements as part of generating a unique fingerprint for the physical item based on features of the physical item which are captured using one or more sensors of the client device 106. These screens may be presented, for example, responsive to the user selecting the selectable element 306 to begin the process of generating the combined listing for the physical item. In example 300, the physical item is depicted as a luxury watch and the client device 106 is depicted as capturing high-definition images of the luxury watch using one or more imaging sensors of the client device 106. However, as described throughout, different types of sensors may be used in place of, or in combination with the imaging sensors, to capture features of the physical item, including temperature sensors, LIDAR, and biochemical sensors, to name just a few.

Figure 3B:
Figure 3C:

At FIG. 3B, the user interface 302 displays information 310 indicating that a unique fingerprint of the physical item can be generated using the client device 106. The user interface 302 also includes a selectable element 312 which can be selected by the user to begin the process of generating the fingerprint for the physical item using client device 106. Responsive to selection of the selectable element 312, the user interface 302 displays instructions 314 for capturing one or more features of the physical item, as depicted in FIG. 3C. Generally, the instructions describe how the user is to control the client device 106 in order to capture features of the physical item. In this example, the instructions 314 are textual instructions which describe how the user is to utilize the imaging sensors of the client device 106 in order to capture features of the physical item. By way of example, instructions 314 instruct the user to "place the item on a flat, well-lit surface" and to "scan the item" using the one or more imaging sensors of the client device 106. FIG. 3C further includes a selectable element 316 that can be selected to initiate the imaging sensors of the client device 106 to "scan" the physical item in order to capture features of the physical item.

Figure 3D:
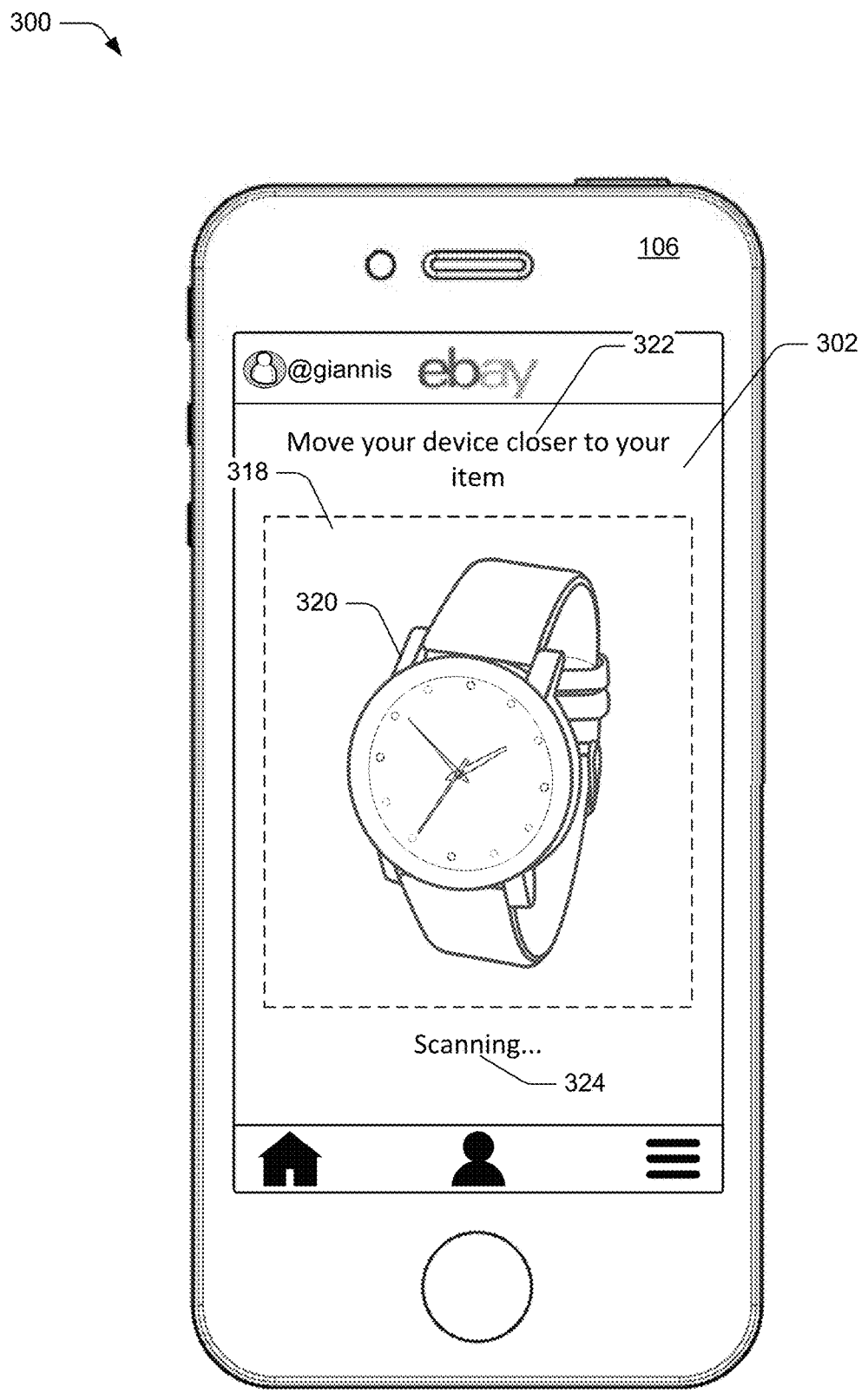

At FIG. 3D, the user interface 302 is depicted as displaying an imaging sensor viewport 318 for aligning the one or more imaging sensors of the client device 106 to capture features of the physical item. In this example, an image 320 of the physical item is shown within the imaging sensor viewport 318 which indicates that the physical item, depicted as a luxury watch, is aligned within the field of view of the imaging sensors. The user interface 302 displays additional instructions 322 for capturing the features of the physical item, which in this instance instruct the user to "move the device closer to the item", e.g., so that the one or more imaging sensors is able to capture close-up images of the physical item. The user interface 302 is further shown as displaying feedback information 324 which indicates that the physical item is being scanned by the one or more imaging sensors of the client device 106.

Figure 3E:
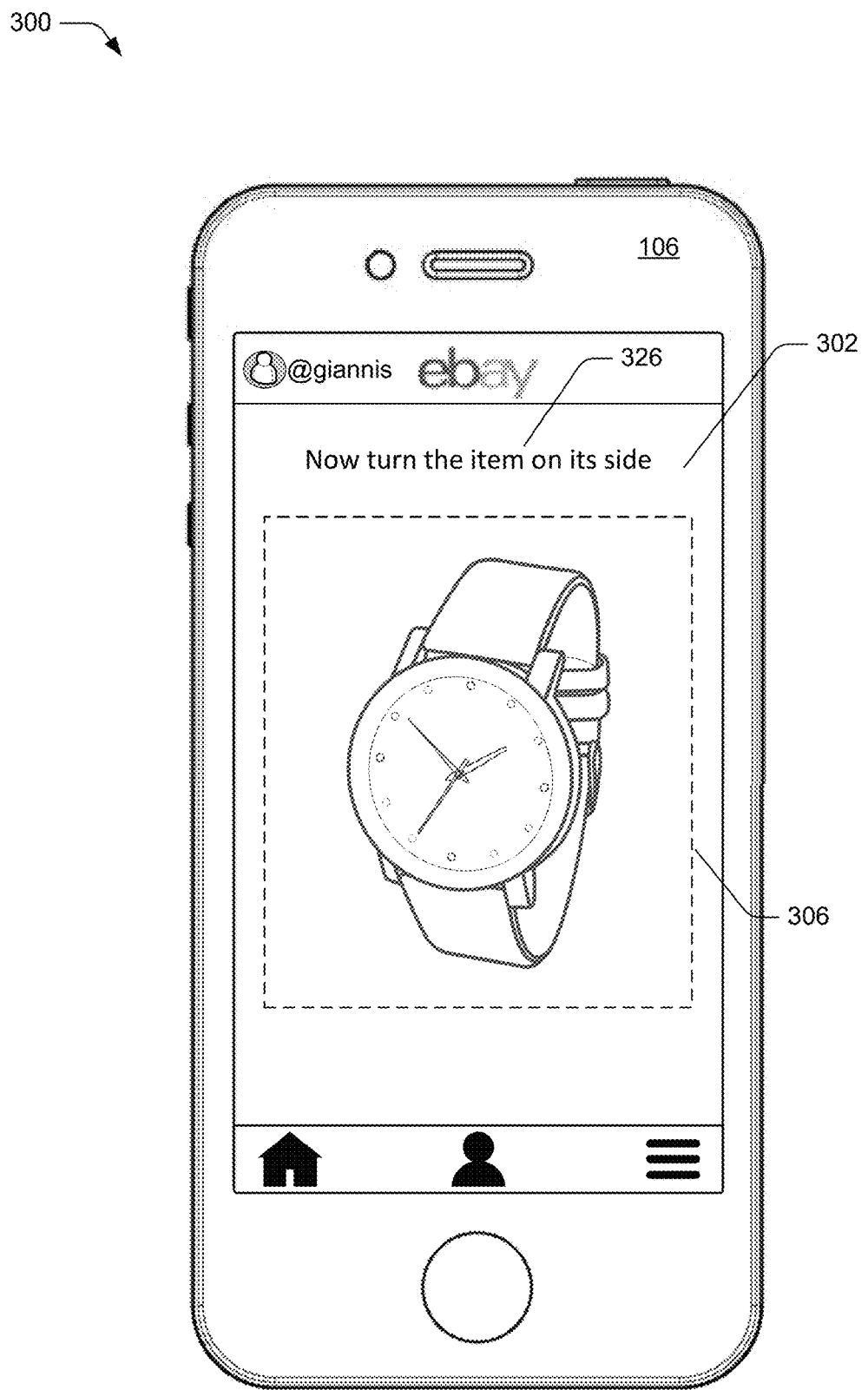

FIG. 3E depicts the user interface 302 displaying additional instructions 326 for capturing features of the physical item. The instructions 326 instruct the user to "turn the item on its side". Responsive to these instructions, the user can turn the luxury watch on its side so that the one or more imaging sensors can continue to capture images of the luxury watch from a different angle. It is to be appreciated that the instructions 314, 322, and 326 are just examples of the types of instructions that can be displayed by the application 142 in order to direct the user to utilize the client device 106 in order to capture features of a physical item. Notably, a variety of different types of instructions may be displayed by the application 142 in order to capture features of a physical item which are usable to generate a unique fingerprint of a physical item. Generally, the types of instructions may also vary for different types of sensors. For example, the instructions output to capture features using an imaging sensor may vary from the type of instructions output to capture features using a temperature sensor. Moreover, the instructions may be output in forms other than text, such as audio prompts or video instructions.

Figure 3F:
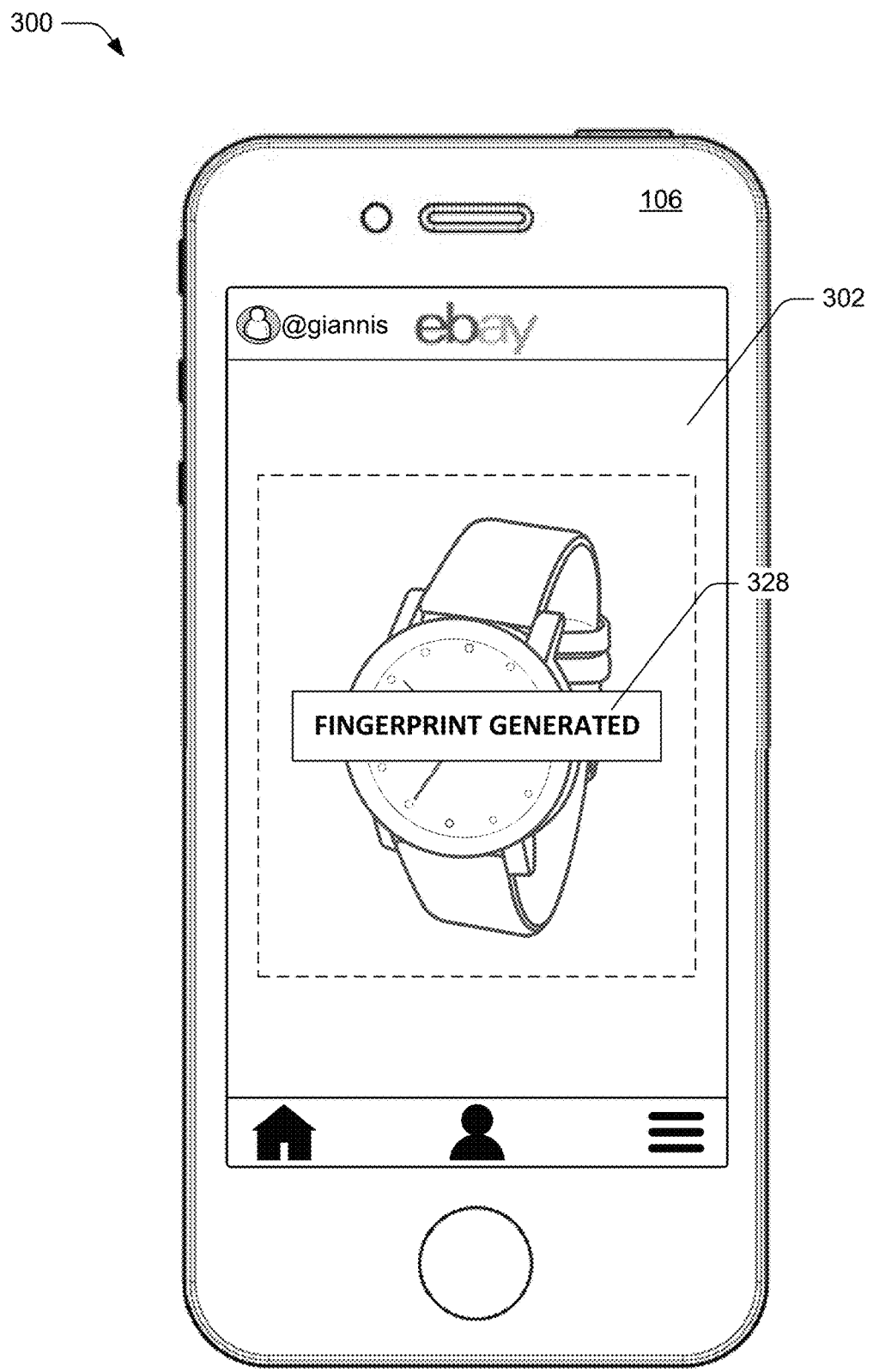

FIG. 3F depicts the user interface 302 displaying information 328 indicating that the fingerprint of the physical item has been successfully generated using the captured features of the physical item. For example, based on the image features of the luxury watch captured by the one or more imaging sensors of client device 106, the fingerprint capture system 130 generates a fingerprint of the luxury watch. Notably, the fingerprint is unique to the physical item and may be used to uniquely identify the physical item from other physical items, including from another specimen of the same item. For example, the fingerprint is usable to distinguish the luxury watch from other luxury watches of the same brand, make, model, etc.

Figure 3G:
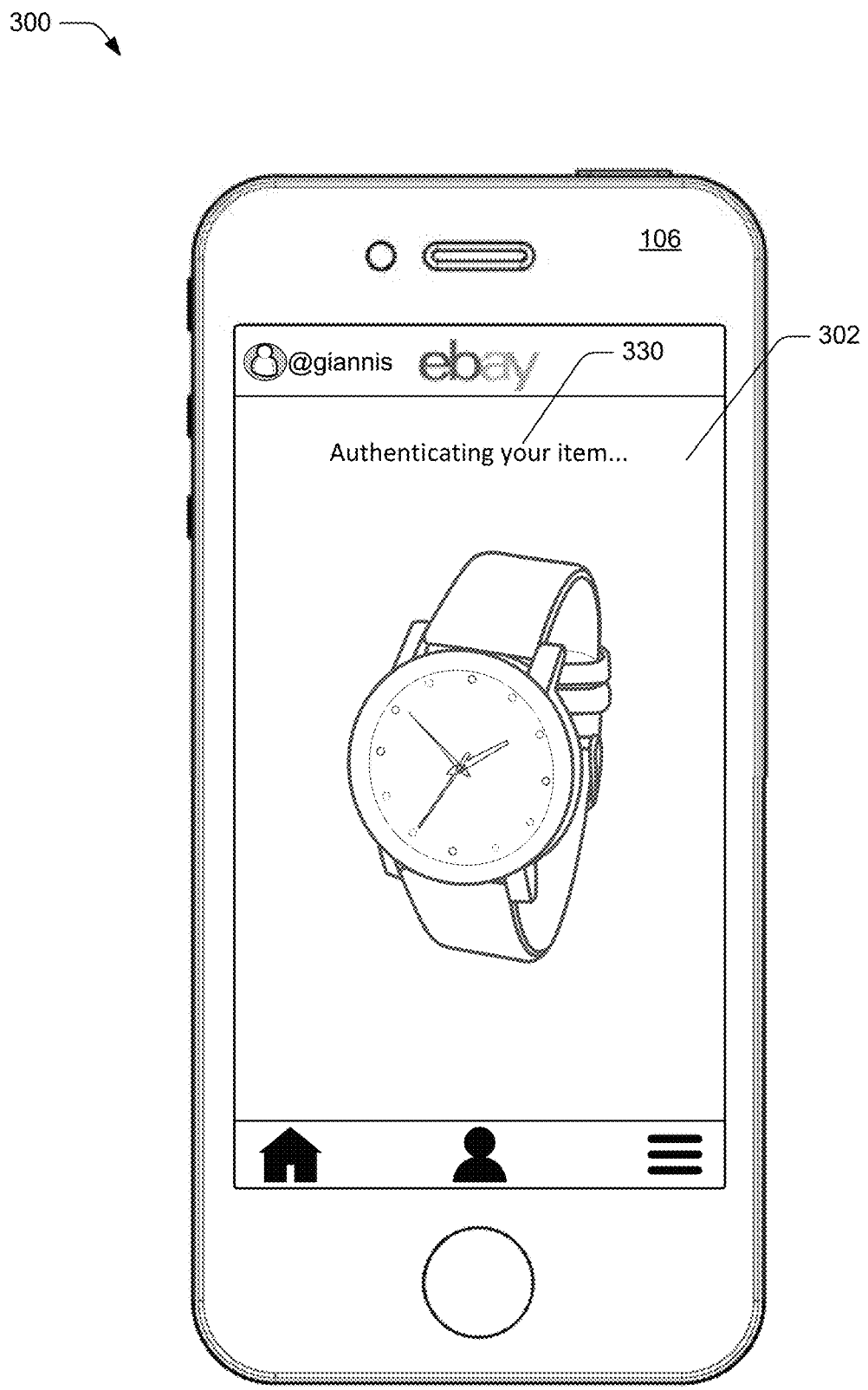

FIG. 3G depicts the user interface 302 displaying information 330 indicating that the authentication service system 132 is currently authenticating the user's physical item. For example, after generating the fingerprint, the fingerprint is provided to the authentication service system 132. The authentication service system 132 is configured to authenticate the physical item based on the fingerprint. In some instances, the fingerprint capture system 130 may transmit the fingerprint to the authentication service system 132 for authentication. As noted above, the fingerprint capture system 130 may be implemented at least in part at a client device, e.g., as part of the application 142 at the client device 106. Thus, the client device 106 may transmit the fingerprint to the authentication service system 132, e.g., over a network.

Figure 3H:
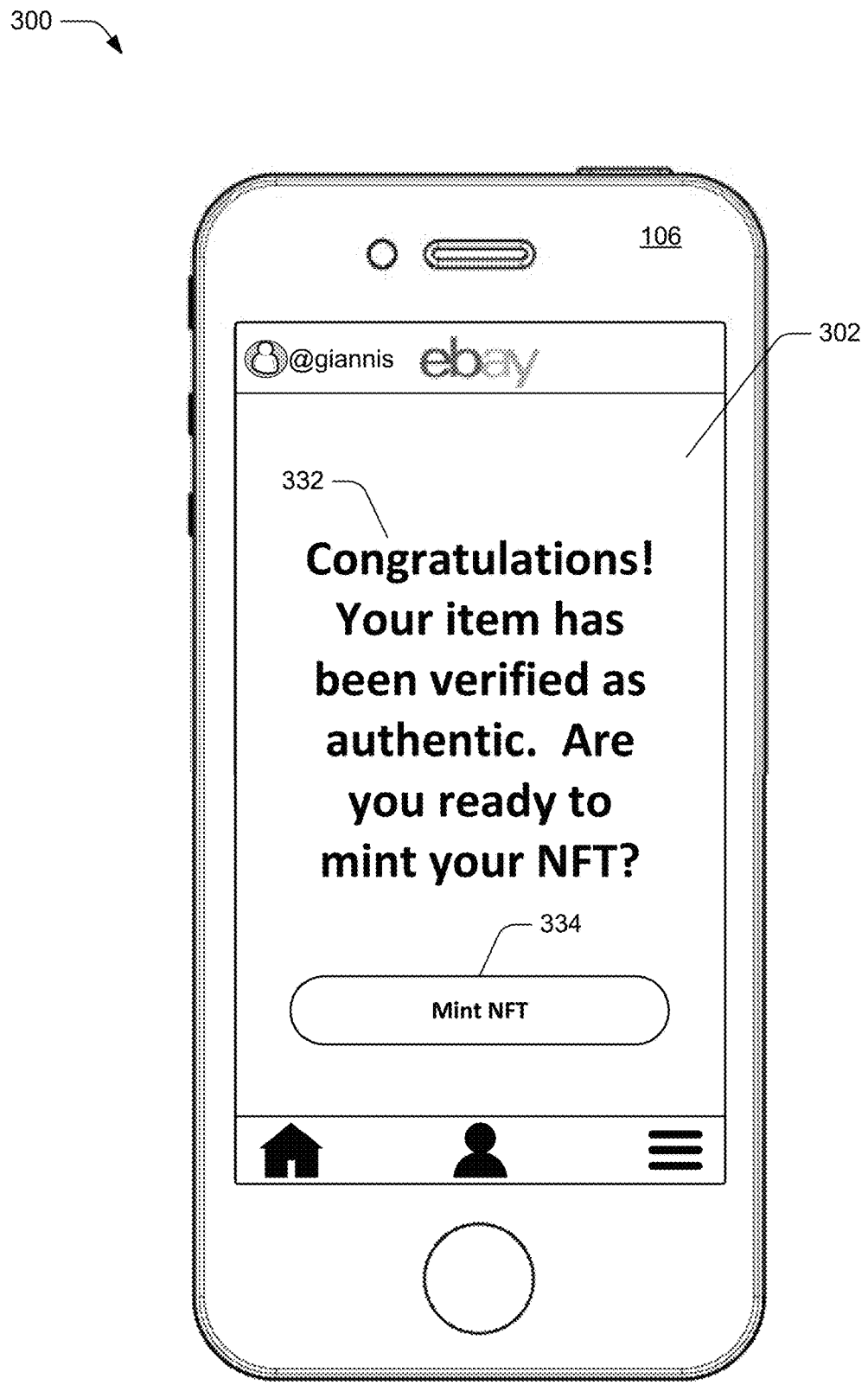

FIG. 3H depicts the user interface 302 displaying information 332 indicating that the luxury watch has been verified by the authentication service system 132 as being authentic. For example, the authentication service system 132 verifies that the luxury watch is authentic by comparing the fingerprint of the luxury watch to the distinguishing feature data 138 stored in the storage 136. The distinguishing feature data 138 describes features of items that are known to be authentic and saved in the storage 136, and the distinguishing feature data 138 is capable through a computerized comparison of identifying those items and/or differentiating those items from items that are not authentic (e.g., knock-offs). If the authentication service system 132 determines that there is a match between the fingerprint 206 and the distinguishing feature data 138, then the authentication service system 132 determines that the luxury watch is an authentic luxury watch, and provides an authentic response to the client device. The user interface 302 thus displays the information 332 based on the authentic response indicating that the luxury watch is authentic.

In FIG. 3H, the user interface 302 also displays a selectable element 334 that is selectable to initiate minting of a digital twin NFT of the luxury watch on the blockchain 116. For example, responsive to a selection of the selectable element 334, the fingerprint of the luxury watch is provided to the minting system 128. The minting system 128 then causes a digital twin NFT of the luxury watch to be minted on the blockchain 116, as described throughout. In one or more implementations, the user interface 302 may provide one or more additional screens for collecting additional information from the user that is usable to mint the digital twin NFT of the physical item.

Figure 4:
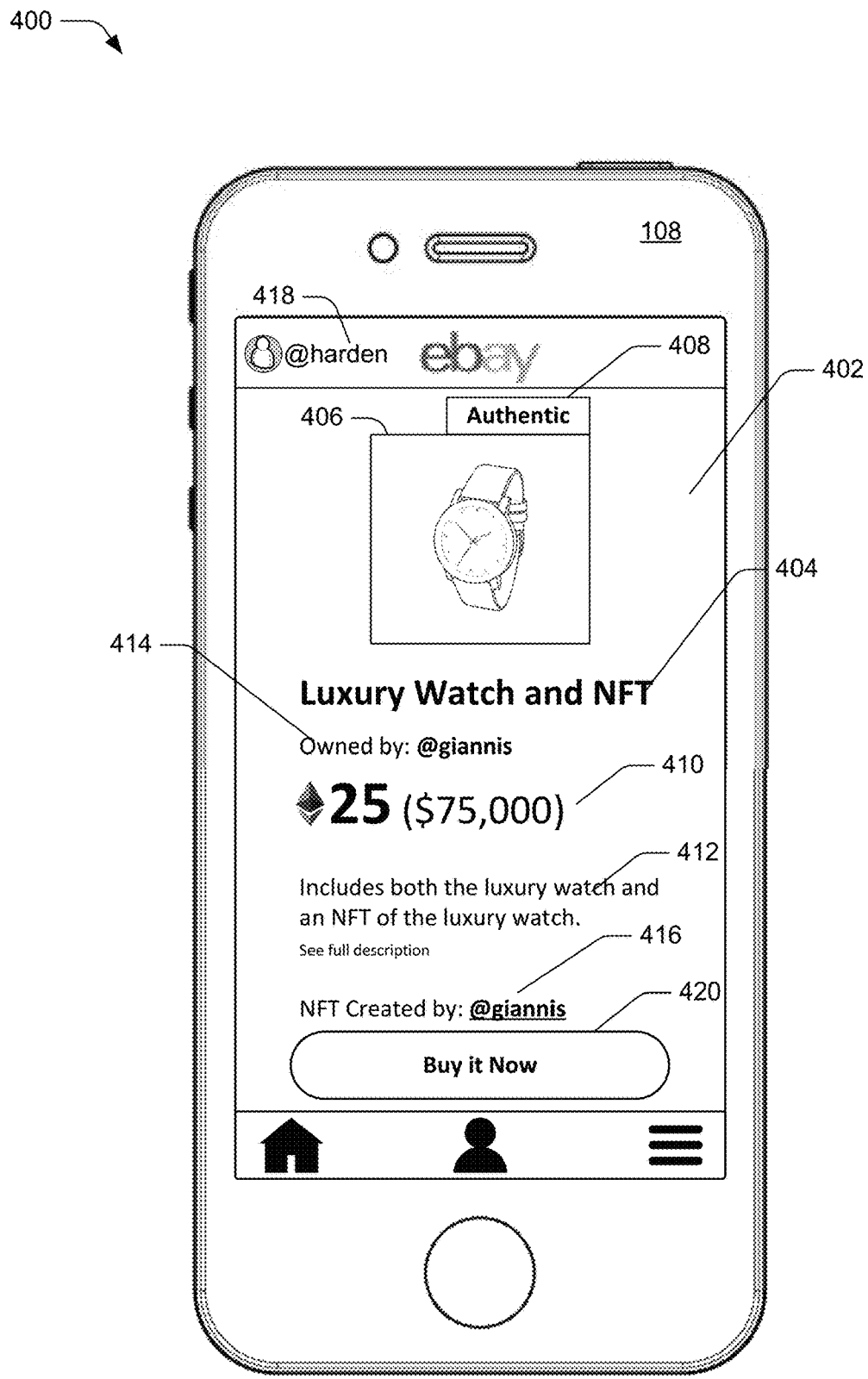
FIG. 4 depicts an example 400 of a combined listing of a physical item and a digital twin NET in accordance with the described techniques.

FIG. 4 depicts an example 400 of a combined listing of a physical item and a digital twin NFT in accordance with the described techniques. The illustrated example 400 includes a combined listing 402 which lists both a physical item and a digital twin NFT together. For example, the combined listing 402 may list the combination of the physical item and the digital twin NFT for sale together via the listing platform 134. In this example, the combined listing 402 lists the combination of a luxury watch and a digital twin NFT of the luxury watch which is minted on the blockchain 116. Examples of generating a fingerprint for the luxury watch and minting the digital twin NFT is described above with regards to FIGS. 3A-3H.

The listing platform 134 can output the combined listing 402, such as by publishing the combined listing 402 to one or more client devices, e.g., associated with user accounts of the service provider system 104 or that navigate to user interfaces of the service provider system 104. The listing platform 134 may expose the combined listing 402 to a plurality of client devices, such that users navigating to the listing or searching for listings can view the combined listing 402. In this example, the combined listing 402 is depicted as being displayed by a web application (e.g., the application 148) via a user interface at the client device 108. Notably, client device 108 corresponds to a different device than the client device 106 which is depicted in FIGS. 3A-3H as generating a unique fingerprint for the luxury watch and minting the digital twin NFT to represent that a different client device associated with a different user is viewing the combined listing, e.g., in order to obtain the luxury watch and the digital twin NFT in exchange for cryptocurrency.

In this example, the combined listing 402 includes a combined listing title 404, an image 406 of the physical item, an authenticity indicator 408, a price 410, a combined listing description 412, ownership information 414, creator information 416, a user account identifier 418, and a selectable control 420 that is selectable to initiate the purchase of the luxury watch and the digital twin NFT.

The combined listing title 404 indicates that the combined listing 402 is for both the "Luxury Watch and NFT", and the image 406 corresponds to an image of the luxury watch. In some cases, the image 406 may correspond to digital content of the digital twin NFT itself. The authenticity indicator 408 indicates that the physical item has been verified as being authentic by the authentication service system 132. The price 410, in this example, is shown as 25 ETH which indicates that the user can obtain the combined listing for 25 ETH (which corresponds to $75,000 US Dollars based on a current valuation of 1 ETH being worth $3,000 US Dollars). The combined listing description 412 includes a description of the combined listing, and can be expanded in some cases to view additional information regarding the combined listing.

In the illustrated example 400, the ownership information 414 and the creator information 416 indicate that both the current owner and creator of the NFT correspond to the same user profile, "@giannis". The user account identifier 420 indicates that the user "@harden" is signed into a user account associated with the service provider system 104. Notably if the @harden user purchases both the luxury watch and the digital twin NFT of the combined listing 402, e.g., by selecting the selectable control 418 and transferring 25 ETH to the @giannis user, then the ownership information 414 will change to indicate that @harden is the current owner of the NFT. In this scenario, however, the creator information 416 will remain the same to signify that @harden is not the original creator of the NFT. It is to be appreciated that the combined listing 402 may include different elements or information without departing from the spirit or scope of the described techniques.

Having discussed exemplary details of the techniques for fingerprinting physical items to mint NFTs, consider now some examples of procedures to illustrate additional aspects of the techniques.

Example Procedures

This section describes examples of procedures for fingerprinting physical items to mint NFTs. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 5:
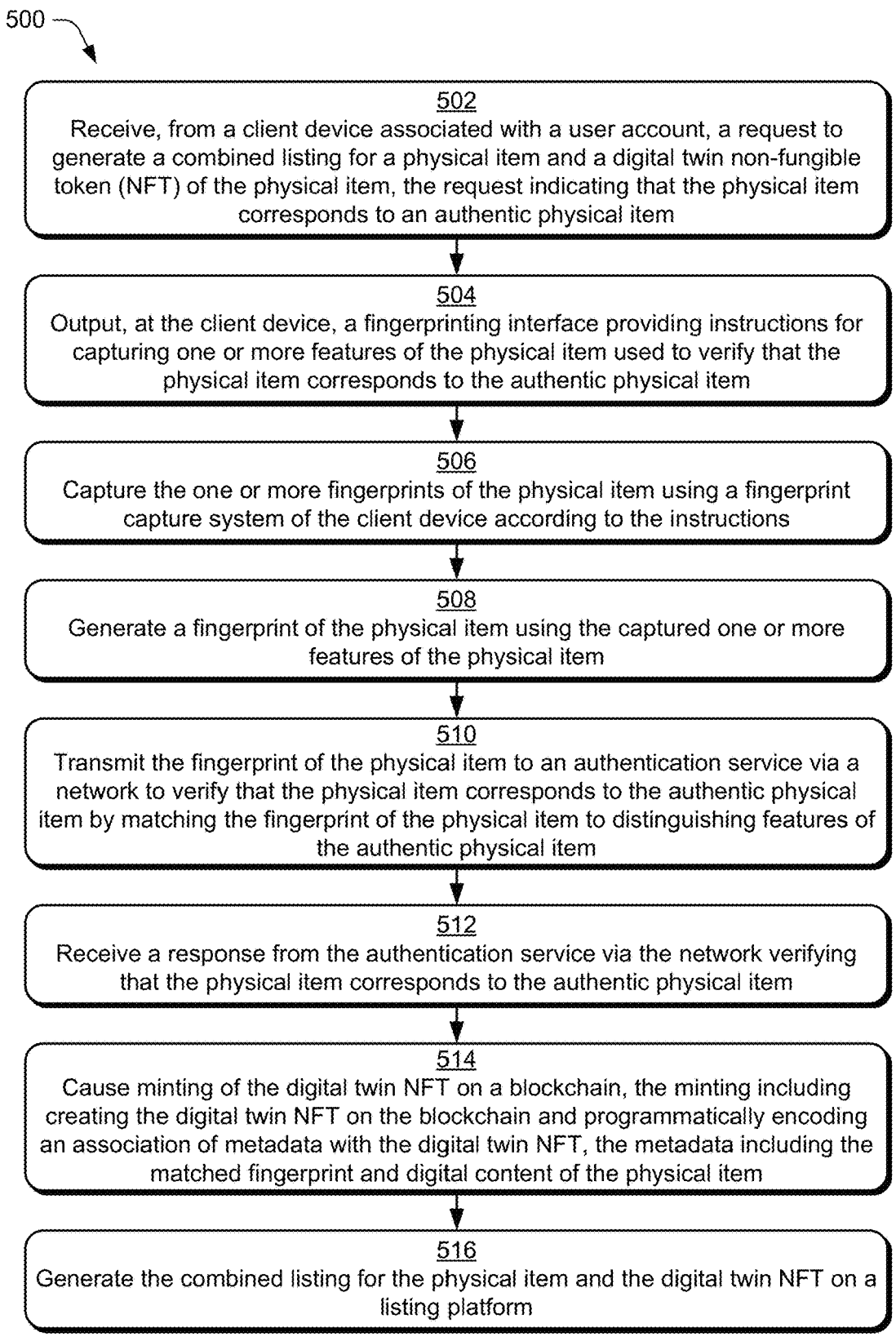
FIG. 5 depicts a procedure in an example implementation of fingerprinting physical items to mint NFTs.

FIG. 5 depicts a procedure 500 in an example implementation of fingerprinting physical items to mint NFTs.

A request to generate a combined listing for a physical item and a digital twin NFT of the physical item is received from a client device associated with a user account (block 502). In accordance with the principles discussed herein, the request indicates that the physical item corresponds to an authentic physical item. By way of example, fingerprint capture system 130 receives a request from client device 106 to generate a combined listing for a physical item 204 and a digital twin NFT of the physical item.

A fingerprinting interface is output at the client device (block 504). In accordance with the principles discussed herein, the fingerprinting interface provides instructions for capturing one or more features of the physical item used to verify that the physical item corresponds to the authentic physical item. By way of example, the fingerprint capture system 130 displays a user interface 302 which provides instructions (e.g., instructions 314, 322, and 326) for capturing one or more features of a physical item 204.

The one or more features of the physical item are captured using a fingerprint capture system of the client device according to the instructions (block 506). By way of example, the fingerprint capture system 130 obtains sensor-captured features 202 according to the instructions output in the fingerprinting interface, e.g., user interface 302. In accordance with the described techniques the sensor-captured features 202 correspond to data describing one or more aspects of the physical item 204 and may include various information captured about the physical item 204, e.g., using sensors of one or more devices. For instance, this information may be generated about the physical item 204 using one or more sensors of the client device 106, the client device 108, and/or one or more sensors of the fingerprint capture system 130 when the fingerprint capture system 130 includes sensors to capture features of physical items.

Examples of sensors that may be used to generate the sensor-captured features 202 include, but are not limited to, imaging sensors (e.g., one or more high-resolution digital cameras, one or more low-resolution digital cameras), temperature sensors, LIDAR, biochemical sensors, and so on. Examples of the sensor-captured features 202 may include, but are not limited to, images (e.g., high-resolution images of the physical item 204's features), videos of the physical item 204, data derived from various electromagnetic spectrum features captured by the sensors about the physical item 204, measured temperatures at different locations of the physical item 204 (or a map of them), a LIDAR scan of the physical item 204, or measurements (or estimated values) of one or more elements or compounds at different locations of the physical item 204, to name just a few.

A fingerprint of the physical item is generated using captured features of the physical item (block 508). By way of example, based on the sensor-captured features 202, the fingerprint capture system 130 generates a fingerprint 206 of the physical item 204. The fingerprint 206 is unique to the physical item 204 and may be used to uniquely identify the physical item 204 from other physical items, including from another specimen of the same item (e.g., two luxury watches of the same brand, make, model, etc.). For example, the fingerprint 206 may be configured as a unique digital signature that identifies the physical item 204 from other physical items.

The fingerprint of the physical item is transmitted to an authentication service via a network to verify that the physical item corresponds to the authentic physical item by matching the fingerprint of the physical item to distinguishing features of the authentic physical item (block 510). By way of example, the fingerprint capture system 130 provides the fingerprint 206 to the authentication service system 132 to verify that the physical item 204 corresponds to an authentic physical item. To do so, the authentication service system 132 compares the fingerprint 206 to the distinguishing feature data 138 stored in the storage 136. The distinguishing feature data 138 describes features of one or more physical items that are known to be authentic and is saved in the storage 136. The authentication service system 132 is capable through a computerized comparison of the digital fingerprint 206 and the distinguishing feature data 138 of identifying those authentic items and/or differentiating them from items that are not authentic.

A response verifying that the physical item corresponds to the authentic physical item is received from the authentication service via the network (block 512). By way of example, if the authentication service system 132 determines that there is a match between the fingerprint 206 and the distinguishing feature data 138, then the authentication service system 132 determines that the physical item 204 is an authentic physical item. Based on matching the fingerprint 206 to data in the distinguishing feature data 138, the authentication service system 132 then provides an authentic response 208, indicating that the physical item 204 is an authentic physical item.

The digital twin NFT is minted on a blockchain (block 514). In accordance with the principles discussed herein, the minting includes creating the digital twin NFT on the blockchain and programmatically encoding an association of metadata that includes the matched fingerprint and digital content of the physical item with the digital twin NFT. By way of example, the minting system 128 obtains the fingerprint 206, and initiates minting of a digital twin NFT 210 on a blockchain 116 by programmatically encoding an association of metadata that includes the matched fingerprint 206 and digital content 214 of the physical item with the digital twin NFT 210.

The combined listing for the physical item and the digital twin NFT is generated on a listing platform (block 516). By way of example, the listing platform 134 generates a combined listing 218, which lists both the physical item 204 and the digital twin NFT 210 together. The combined listing 218 may list the combination of the physical item 204 and the digital twin NFT 210 for sale together via the listing platform 134. The listing platform 134 can output the combined listing 218, such as by publishing the combined listing 218 to one or more client devices, e.g., associated with user accounts of the service provider system 104 or that navigate to user interfaces of the service provider system 104. By way of example, the combined listing 218 may be displayed or otherwise output by a web application (e.g., the application 142 or the application 148) via a user interface at the client devices 106, 108. In one or more implementations, the listing platform 134 may expose the combined listing 218 to a plurality of client devices, such that users navigating to the listing or searching for listings can view the combined listing 218.

Having described examples of procedures in accordance with one or more implementations, consider now an example of a system and device that can be utilized to implement the various techniques described herein.

Example System and Device

Figure 6:
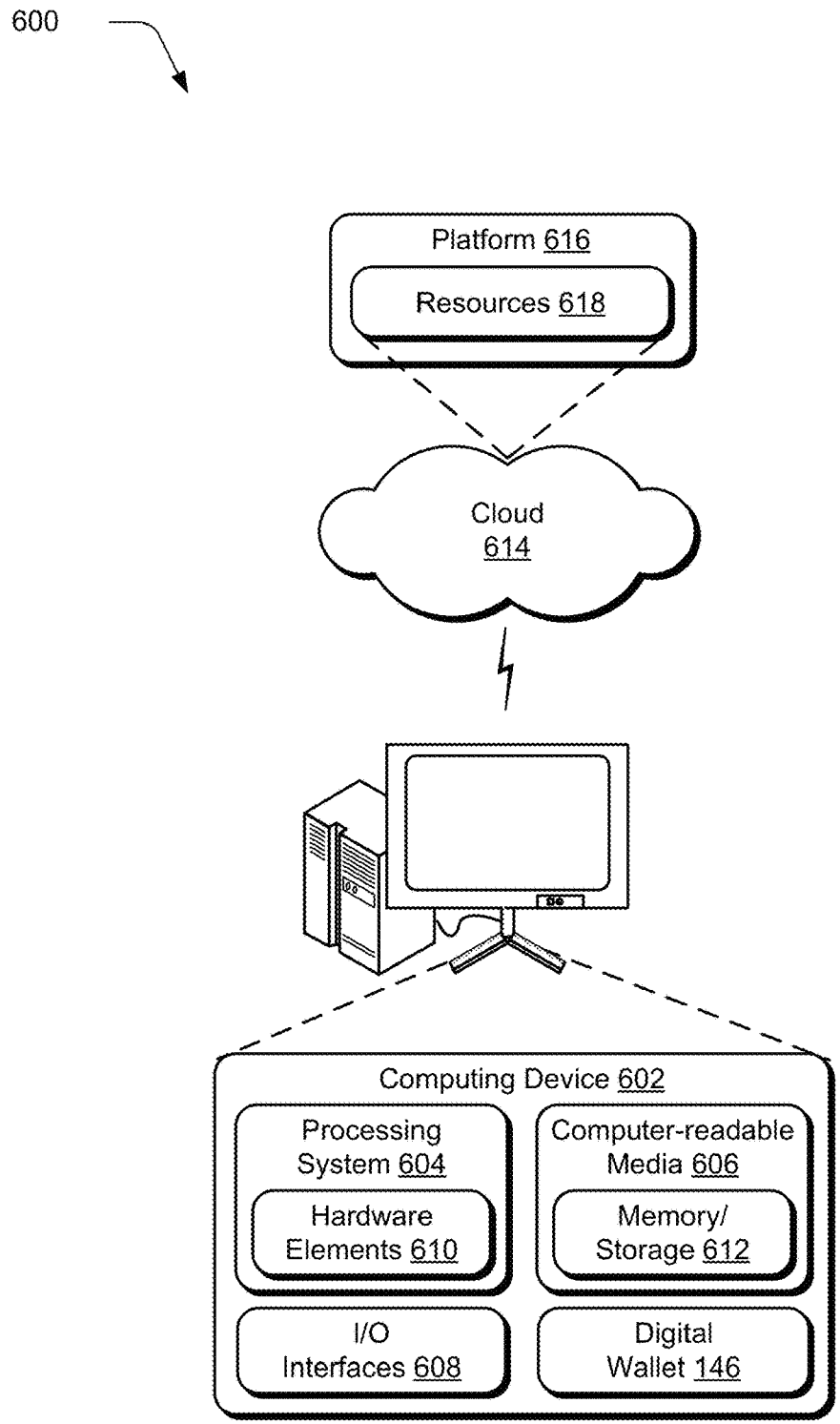
FIG. 6 illustrates an example of a system including various components of an example device that can be implemented as any type of computing device as described and/or utilized with reference to FIGS. 1-5 to implement embodiments of the techniques described herein.

FIG. 6 illustrates an example of a system generally at 600 that includes an example of a computing device 602 that is representative of one or more computing systems and/or devices that may implement the various techniques described herein. This is illustrated through inclusion of the digital wallet 146. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
    receiving, from a client device, a request to generate a combined listing for a physical item and a digital twin non-fungible token (NFT) of the physical item, the request indicating that the physical item corresponds to an authentic physical item;
    outputting, at the client device, a fingerprinting interface providing instructions for capturing one or more features of the physical item used to verify that the physical item corresponds to the authentic physical item;
    capturing the one or more features of the physical item using a fingerprint capture system of the client device according to the instructions;
    generating a fingerprint of the physical item using the captured one or more features of the physical item;
    transmitting the fingerprint of the physical item to an authentication service via a network to verify that the physical item corresponds to the authentic physical item by matching the fingerprint of the physical item to distinguishing features of the authentic physical item;
    receiving a response from the authentication service via the network verifying that the physical item corresponds to the authentic physical item;
    causing minting of the digital twin NFT on a blockchain, the minting including creating the digital twin NFT on the blockchain and programmatically encoding an association of metadata with the digital twin NFT, the metadata including the matched fingerprint, digital content of the physical item, and a condition of the physical item; and
    generating the combined listing for the physical item and the digital twin NFT on a listing platform.

2. The method as described in claim 1, wherein the condition of the physical item can change over time but the fingerprint of the physical item does not change over time.

3. The method as described in claim 1, wherein the condition of the physical item is generated based on the captured features of the physical item.

4. The method as described in claim 3, further comprising:
capturing one or more additional features of the physical item;
determining that the condition of the physical item has changed based on a comparison of the one or more additional features to the condition of the physical item included with the metadata of the digital twin NFT; and
updating the metadata of the digital twin NFT with the changed condition of the physical item.

5. The method as described in claim 1, wherein the digital content of the physical item includes one or more images of the physical item, a video of the physical item, or a 3D model of the physical item.

6. The method as described in claim 1, wherein the fingerprint capture system includes a high-resolution digital camera, and wherein the captured features of the physical item include high-resolution image features of the physical item.

7. The method as described in claim 1, wherein the metadata of the digital twin NFT further includes an indication that the physical item corresponds to the authentic physical item.

8. The method as described in claim 1, wherein the physical item comprises a used item.

9. The method as described in claim 1, wherein the physical item is not modified to include an identifier associated with the digital twin NFT.

10. A computing device comprising:
a fingerprint capture system to capture one or more features of a physical item; and
at least a memory and a processor to perform operations comprising:
generating a fingerprint of the physical item using the captured one or more features of the physical item;
transmitting the fingerprint of the physical item to an authentication service via a network to verify that the physical item corresponds to an authentic physical item by matching the fingerprint of the physical item to distinguishing features of the authentic physical item;
receiving a response from the authentication service via the network verifying that the physical item corresponds to the authentic physical item;
causing minting of a digital twin non-fungible token (NFT) of the physical item on a blockchain using the matched fingerprint, wherein the minting includes creating the digital twin NFT on the blockchain and programmatically encoding an association of metadata with the digital twin NFT, and wherein the metadata includes at least the matched fingerprint and a condition of the physical item; and
generating a combined listing for the physical item and the digital twin NFT on a listing platform.

11. The computing device as described in claim 10, wherein the fingerprint capture system includes a high-resolution digital camera, and wherein the captured features of the physical item include high-resolution image features of the physical item.

12. The computing device as described in claim 10, wherein the metadata further includes an indication that the physical item corresponds to the authentic physical item.

13. The computing device as described in claim 10, further comprising outputting a fingerprinting interface that includes instructions for capturing the one or more features of the physical item, and wherein the one or more features of the physical item are captured using the fingerprint capture system according to the instructions included in the fingerprinting interface.

14. The computing device as described in claim 13, wherein the instructions comprise textual instructions for capturing the one or more features of the physical item that are displayed in the fingerprinting interface.

15. The computing device as described in claim 13, wherein the instructions comprise audio prompts for capturing the one or more features of the physical item.

16. The computing device as described in claim 10, wherein the condition of the physical item can change over time but the fingerprint of the physical item does not change over time.

17. The computing device as described in claim 10, wherein the condition of the physical item is generated based on the captured features of the physical item.

18. A system comprising:
a fingerprint capture system to generate a fingerprint of a physical item using one or more features of the physical item captured using one or more sensors of a client device;
an authentication service system to verify that the physical item corresponds to an authentic physical item by matching the fingerprint of the physical item to distinguishing features of the authentic physical item;
a minting system to mint a digital twin non-fungible token (NFT) of the physical item on a blockchain by creating the digital twin NFT on the blockchain and programmatically encoding an association of metadata with the digital twin NFT, the metadata including at least the matched fingerprint and a condition of the physical item; and
a listing platform to generate a combined listing for the physical item and the digital twin NFT.

19. The system of claim 18, wherein the condition of the physical item can change over time but the fingerprint of the physical item does not change over time.

20. The system as described in claim 18, wherein the condition of the physical item is generated based on the one or more features of the physical item capturing using the one or more sensors of the client device.

* * * * *